United States Patent
Zhang et al.

(10) Patent No.: US 12,160,759 B2
(45) Date of Patent: Dec. 3, 2024

(54) CONFIGURED TIME GAP FOR SI BEAM FAILURE MEASUREMENT AND INDICATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/395,394

(22) Filed: Aug. 5, 2021

(65) Prior Publication Data
US 2023/0038737 A1 Feb. 9, 2023

(51) Int. Cl.
*H04W 24/04* (2009.01)
*H04L 5/14* (2006.01)
*H04W 24/08* (2009.01)
*H04W 72/21* (2023.01)

(52) U.S. Cl.
CPC ............. *H04W 24/04* (2013.01); *H04L 5/14* (2013.01); *H04W 24/08* (2013.01); *H04W 72/21* (2023.01)

(58) Field of Classification Search
CPC ..... H04W 24/04; H04W 24/08; H04W 72/21; H04L 5/14
See application file for complete search history.

(56) References Cited

U.S. PATENT DOCUMENTS

| | | | |
|---|---|---|---|
| 2021/0068123 A1* | 3/2021 | Zhu | H04B 7/0874 |
| 2021/0235301 A1* | 7/2021 | Abedini | H04W 72/23 |
| 2023/0189315 A1* | 6/2023 | Haustein | H04W 24/02 |
| | | | 370/252 |

FOREIGN PATENT DOCUMENTS

WO    WO-2019165224 A1 *   8/2019   ........... H04B 7/0626

OTHER PUBLICATIONS

International Search Report and Written Opinion—PCT/US2022/035529—ISA/EPO—Nov. 29, 2022.
Partial International Search Report—PCT/US2022/035529—ISA/EPO—Oct. 5, 2022.

* cited by examiner

*Primary Examiner* — Saad A. Waqas
(74) *Attorney, Agent, or Firm* — Procopio, Cory, Hargreaves & Savitch LLP

(57) ABSTRACT

A base station may identify a configuration of one or more time gap periods associated with FD beam pair quality measurement. The base station may transmit, to the UE, and the UE may receive, from the base station, an indication of the configuration of the one or more time gap periods associated with FD beam pair quality measurement. The UE may perform, during the one or more time gap periods, one or more measurements of a quality of one or more FD beam pairs. Each of the one or more FD beam pairs may include an uplink beam and a downlink beam. The UE may identify at least one failed FD beam pair in the one or more FD beam pairs based on the one or more measurements of the quality of the one or more FD beam pairs and an SI measurement.

18 Claims, 12 Drawing Sheets

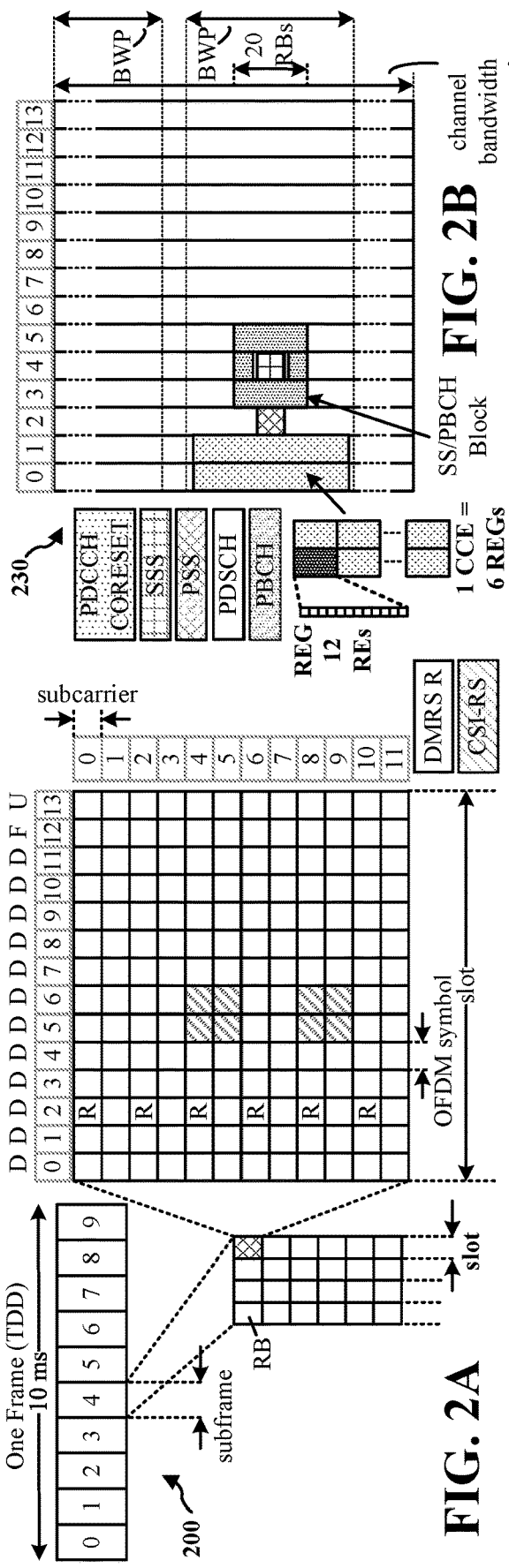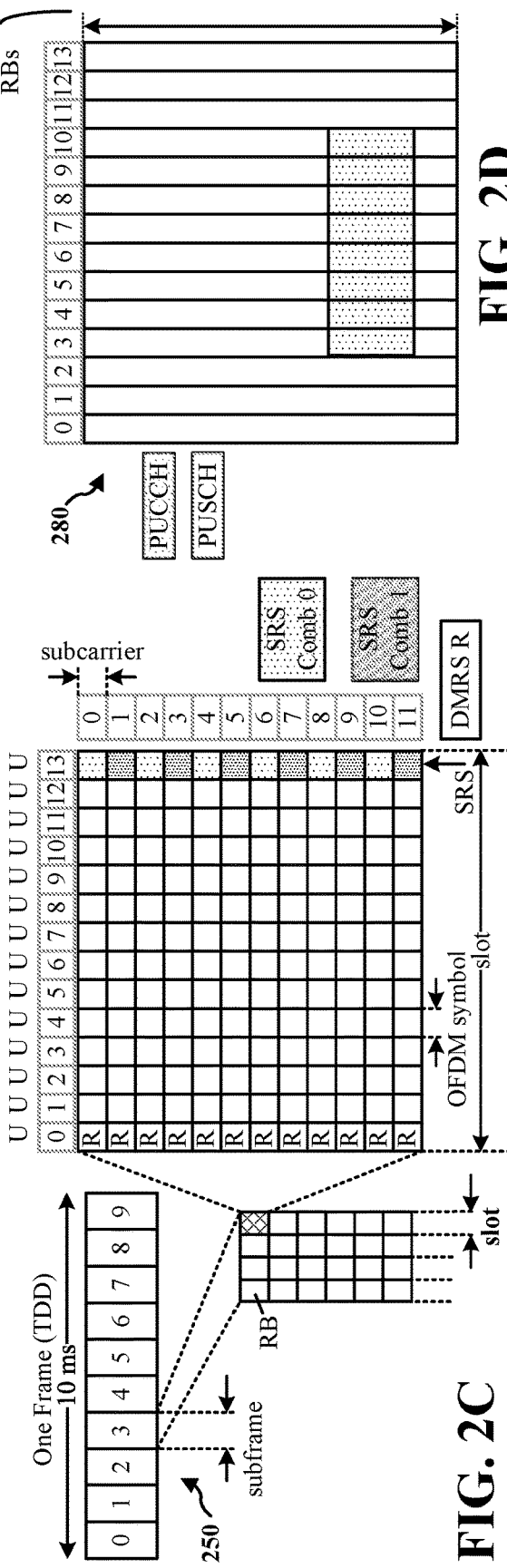
FIG. 2A
FIG. 2B
FIG. 2C
FIG. 2D

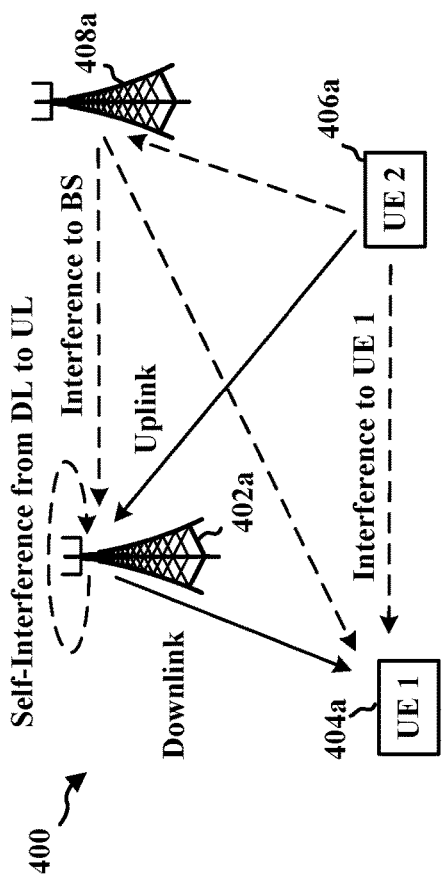
FIG. 4A
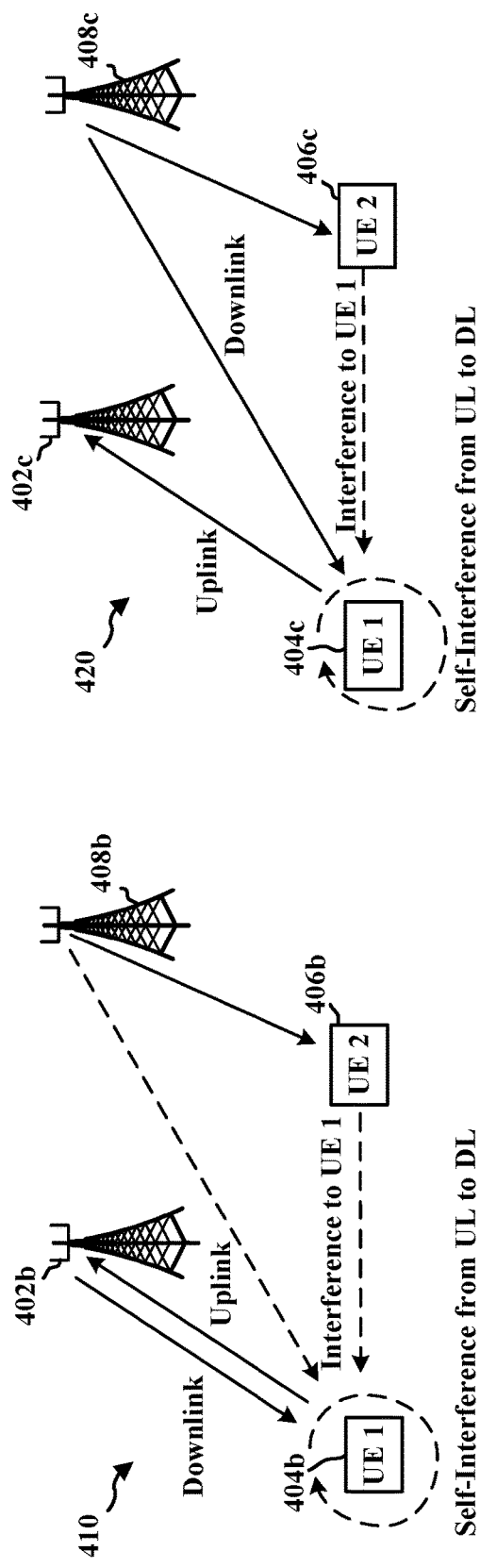
FIG. 4C
FIG. 4B

CONFIGURED TIME GAP FOR SI BEAM FAILURE MEASUREMENT AND INDICATION

TECHNICAL FIELD

The present disclosure relates generally to communication systems, and more particularly, to managing a full duplex (FD) beam pair in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of a configuration of one or more time gap periods associated with FD beam pair quality measurement. The apparatus may perform, during the one or more time gap periods, one or more measurements of a quality of one or more FD beam pairs. Each of the one or more FD beam pairs may include an uplink beam and a downlink beam.

In an aspect of the disclosure, a method, a computer-readable medium, and an apparatus are provided. The apparatus may be a base station. The apparatus may identify a configuration of one or more time gap periods associated with FD beam pair quality measurement. The apparatus may transmit, to a UE, an indication of the configuration of the one or more time gap periods associated with FD beam pair quality measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A, 4B, and 4C illustrate example diagrams of full duplex wireless communication.

DETAILED DESCRIPTION

Figure 1:
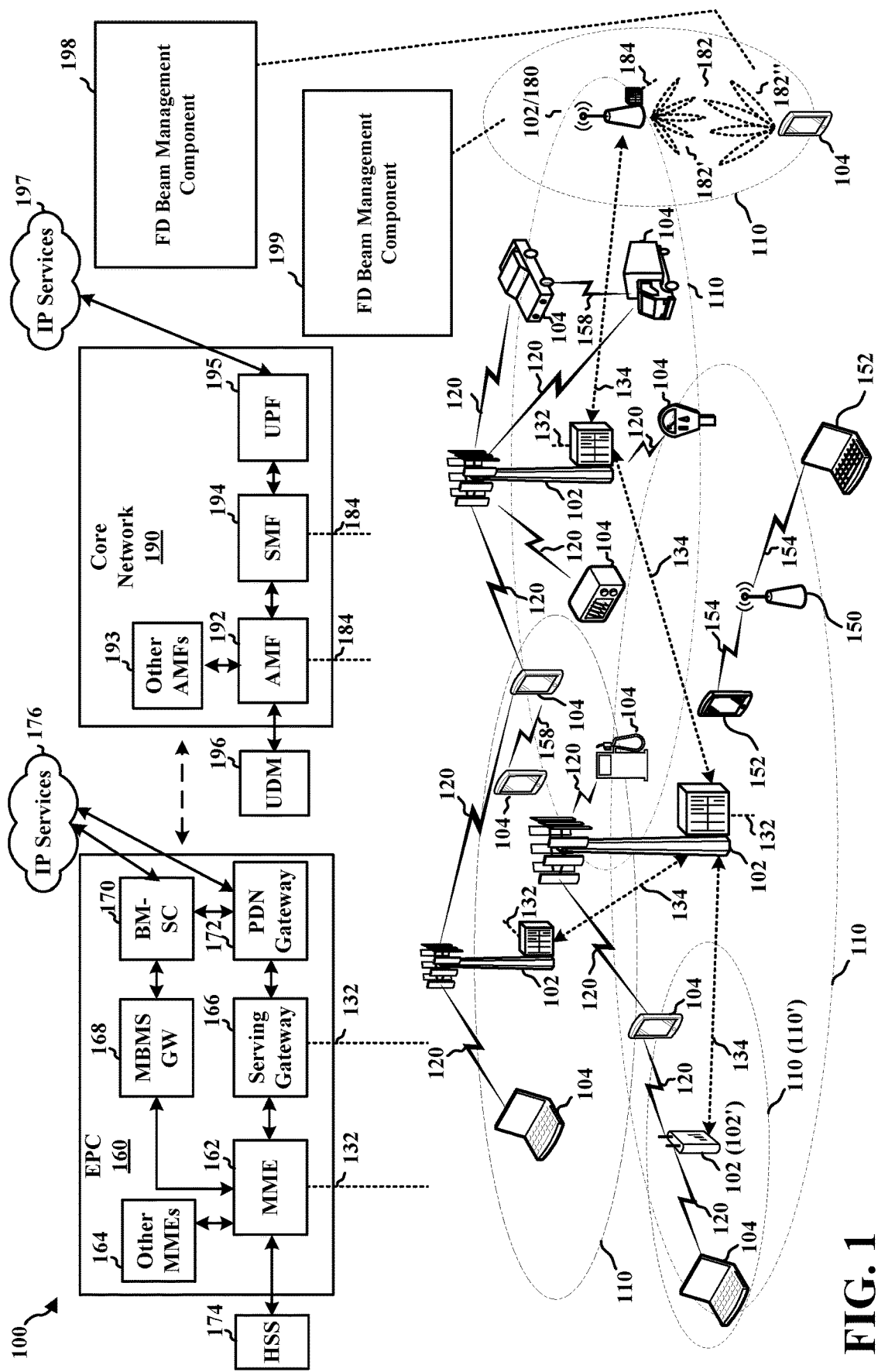
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an FD beam management component 198 that may be configured to receive, from a base station, an indication of a configuration of one or more time gap periods associated with FD beam pair quality measurement. The FD beam management component 198 may be configured to perform, during the one or more time gap periods, one or more measurements of a quality of one or more FD beam pairs. Each of the one or more FD beam pairs may include an uplink beam and a downlink beam. In certain aspects, the base station 180 may include an FD beam management component 199 that may be configured to identify a configuration of one or more time gap periods associated with FD beam pair quality measurement. The FD beam management component 199 may be configured to transmit, to a UE, an indication of the configuration of the one or more time gap periods associated with FD beam pair quality measurement. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |

| μ | SCS<br>$\Delta f = 2^\mu \cdot 15$[kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
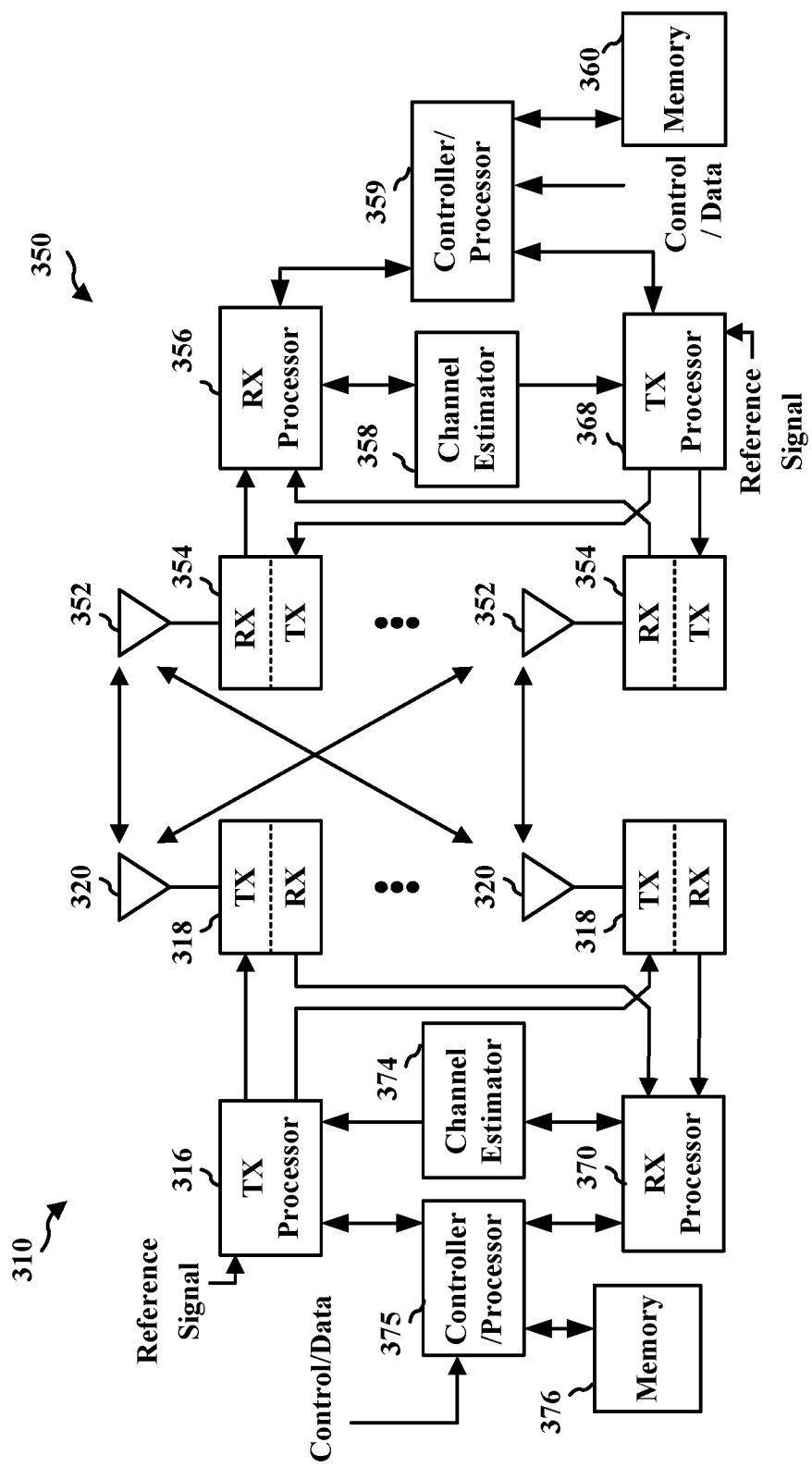
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range, in partially overlapped frequency ranges, or in separate frequency ranges. In some examples, the frequency range may be a millimeter wave (mmW) frequency range, e.g., frequency range 2 (FR2). In some examples, the frequency range may be a sub-6 GHz frequency range, e.g., frequency range 1 (FR1). The aspects presented herein may also be applied to other frequency ranges. Full duplex capability may be supported at a base station and/or a UE. For example, a UE may transmit uplink communication from one antenna panel and may receive downlink communication with another antenna panel. For another example, a base station may transmit to one UE from one antenna panel and may receive from another UE with another antenna panel. For another example, a base station may transmit to one UE from one antenna panel and may receive from the same UE with another antenna panel. In some examples, the full duplex communication may be conditional on beam or spatial separation or other conditions.

Full duplex communication may reduce latency. For example, full duplex operation may enable a UE to receive a downlink signal in an uplink slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4C illustrate various modes of full duplex communication. Full duplex communication supports transmission and reception of information over a same frequency band, over partially overlapped frequency bands, or over separate frequency bands in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference (SI) caused by signal leakage from its local transmitter to its local receiver. In addition, the UE or base station may also experience interference from other devices, such as transmissions from a second UE or a second base station. Clutter echo (e.g., signal reflections caused by reflectors such as walls) may be another source of interference. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first base station 402a is a full duplex base station, whereas the first UE 404a and the second UE 406a may be configured as either a half-duplex UE or a full duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full duplex communication 410 in which a first base station 402b is in full duplex communication with a first UE 404b. In this example, the first base station 402b is a full duplex base station and the first UE 404b is a full duplex UE. The first base station 402b and the UE 404b can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full duplex communication 420 in which a first UE 404c is a full duplex UE in communication with a first base station 402c and a second base station 408c. The first base station 402c and the second base station 408c may serve as multiple transmission reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, i.e., be received by, the UE's receiver. The first UE 404c may experience additional interference from the second UE 406c.

Figure 5:
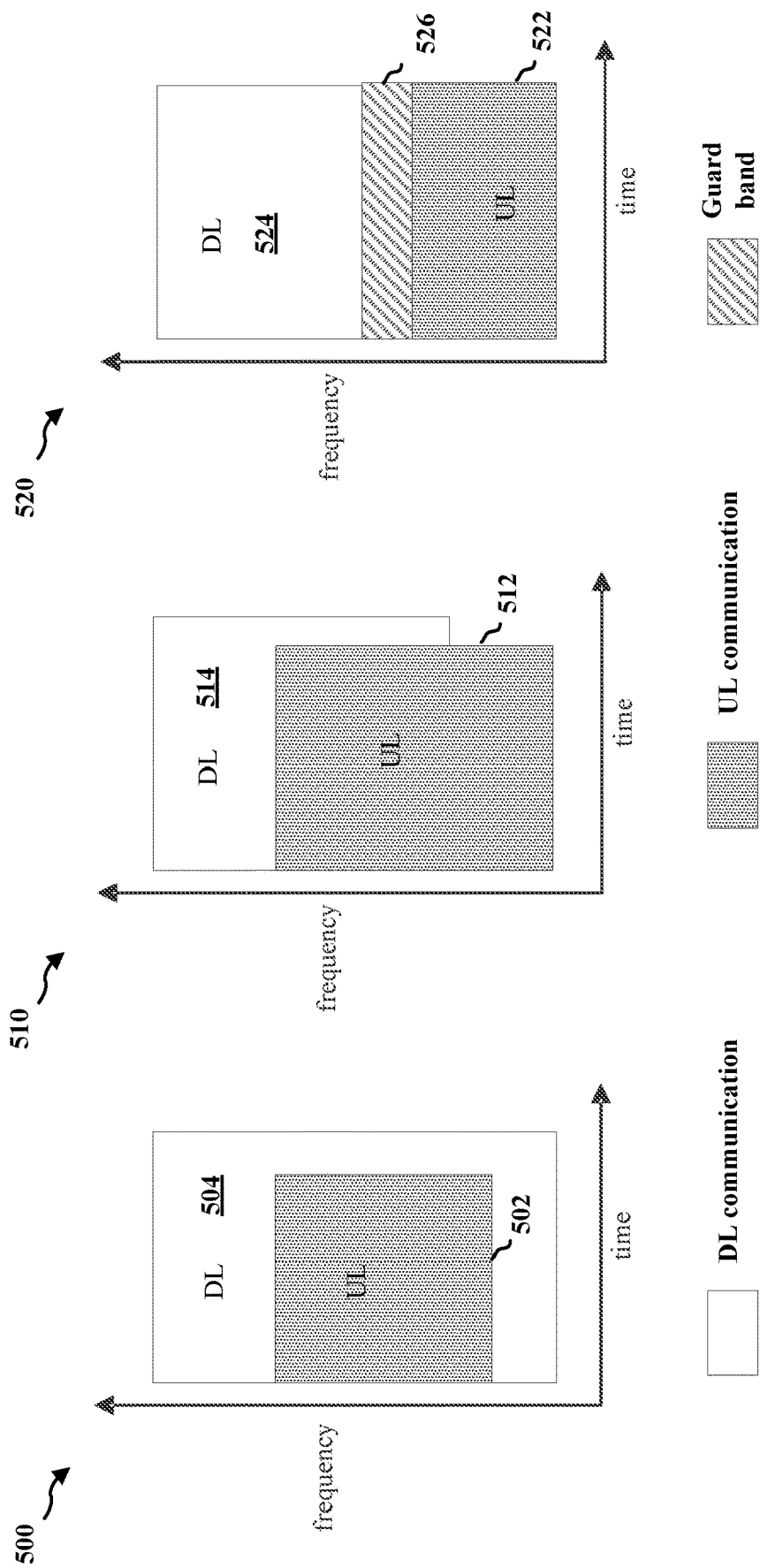
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full duplex (IBFD) resources and a third example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band frequency division duplex (FDD), where uplink and downlink resources may overlap in time using different frequencies, as shown in the third example 520. In the third example 520, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex."

In FD transmissions, simultaneous downlink and uplink transmission and reception may be possible. The base station may schedule the uplink transmission and the downlink transmission separately (e.g., via separate DCI messages), or via a single DCI message or a single RRC message. Downlink transmissions may include at least one of a transmission via a PDSCH, a transmission based on semi-persistent scheduling (SPS), a CSI-RS, or an SSB. Uplink transmissions may include at least one of a transmission via a PUSCH, a transmission based on a configured grant (CG), an SRS, or a transmission via a physical random access channel (PRACH).

The base station may configure a UE with periodic (e.g., every 100 ms) beam management cycles to check whether or not beam pairs for downlink and uplink transmissions are still working well. A beam pair may no longer perform properly due to, for example, environmental changes or changes in channel conditions. However, a beam management cycle for FD transmissions may be associated with a large overhead because every possible combination of a downlink beam and an uplink beam may be checked during the beam management cycle. Accordingly, the configured periodicity of the beam management cycles may be large (in other words, two consecutive beam management cycles may be separated by a relatively long period of time).

As a result, scheduled periodic or aperiodic FD downlink and uplink transmissions may take place after the downlink or uplink transmission configuration indicator (TCI) state associated with the FD downlink and uplink transmissions has failed, or has become outdated or non-compatible due to, for example, increased SI, but before the next beam management cycle may take place. Accordingly, the FD downlink or uplink transmissions may fail. Therefore, technique for checking the FD beam pair status and for selecting a new FD beam pair when necessary may be useful.

In one or more aspects, a base station may configure a UE with a time gap period. The UE may use the time gap period to perform its own FD beam pair calibration. For example, during the configured time gap period, the UE may measure the quality and status of currently active FD beam pairs. If the quality of the currently active FD beam pairs is below a quality threshold, the UE may use the time gap period to discover and measure one or more new candidate FD beam pairs.

Figure 6:
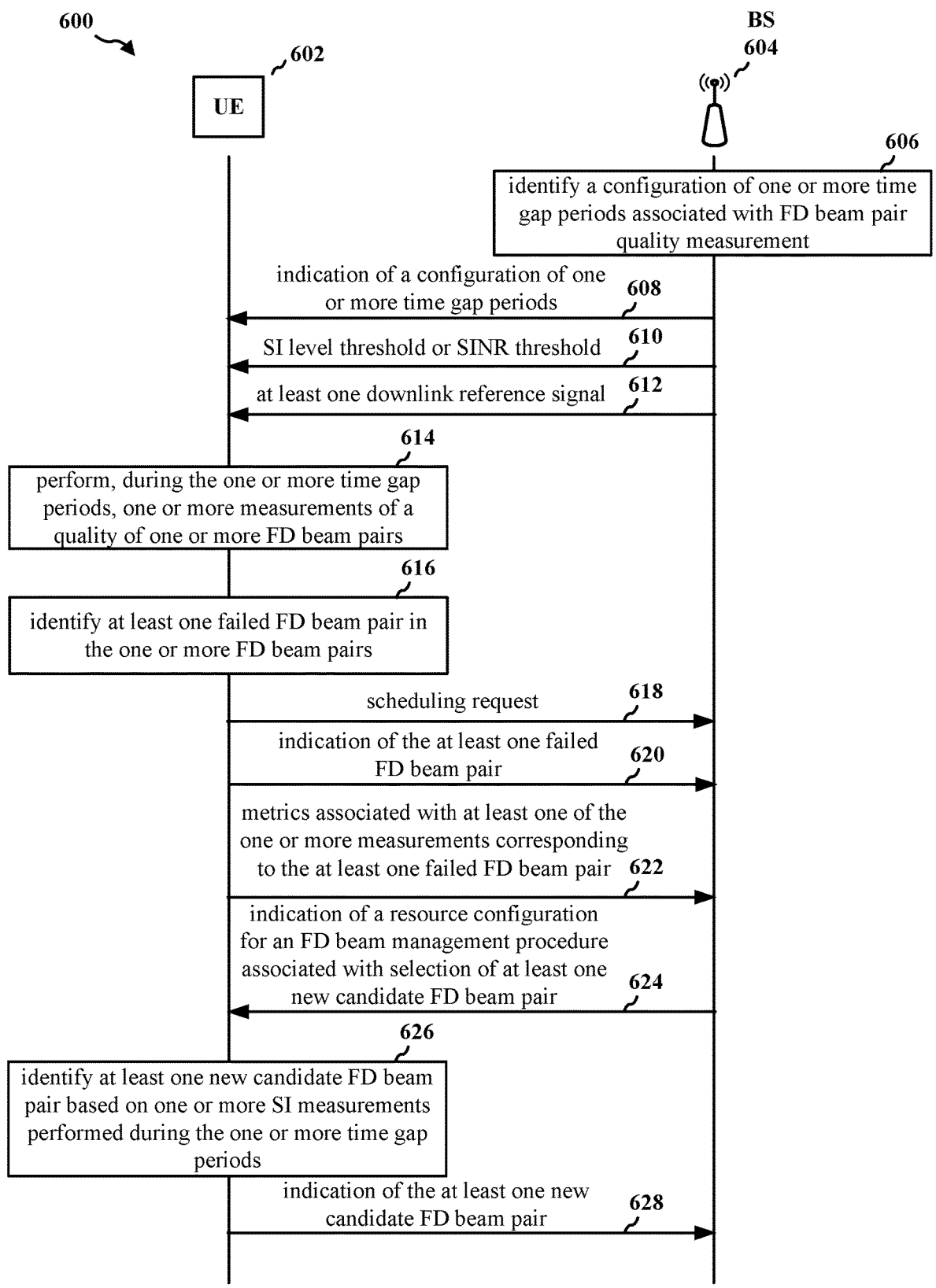
FIG. 6 is a diagram of a communication flow of a method of wireless communication.

FIG. 6 is a diagram of a communication flow 600 of a method of wireless communication. At 606, the base station 604 may identify a configuration of one or more time gap periods associated with FD beam pair quality measurement. At 608, the base station 604 may transmit, to a UE 602, and the UE 602 may receive, from the base station 604, an indication of the configuration of the one or more time gap periods associated with FD beam pair quality measurement.

In one configuration, the time gap period may be periodic (e.g., every 15 ms, every 20 ms, etc.). In one configuration, the time gap period may be semi-persistent. In one configuration, the time gap period may be aperiodic. In one aspect, the base station (e.g., the base station 604) may configure a time gap period when there is no scheduled downlink or uplink traffic (e.g., no uplink scheduling request (SR) has been received by the base station) in the near future (e.g., in the upcoming N slots, where N is a natural number).

In one configuration, the time gap period may be specific to a UE (e.g., the UE 602). The base station may signal the UE-specific time gap period to the specific UE via one of a DCI message, a MAC—control element (CE) (MAC-CE), or an RRC message.

In one configuration, the time gap period may be specific to a group of UEs. To be configured with the same time gap period, the group of UEs may be associated with no or a limited cross link interference (CLI). The base station may signal the time gap period to the group of FD UEs via, e.g., a group-common DCI message. In different configurations, the time gap period may be K symbols, or M slots in duration (where K and M are natural numbers).

At 614, the UE 602 may perform, during the one or more time gap periods, one or more measurements of a quality of one or more FD beam pairs. In one aspect, the UE may identify the quality and status of the FD beam pairs based on SI measurements. An SI level threshold may be used with the SI measurement. The UE may autonomously measure the SI associated with one or more FD beam pairs within the time gap period. If the measured SI level associated with an FD beam pair is above the SI level threshold, the UE may identify the FD beam pair as failed or in a substandard condition. Otherwise, the UE may identify the FD beam pair as healthy. To measure the SI, the UE may transmit an uplink reference signal (e.g., an SRS) using the uplink beam (e.g., the uplink beam 1) of a currently active FD beam pair, and may receive the uplink reference signal via the downlink beam (e.g., the downlink beam 2) of the same currently active FD beam pair. The UE may measure the SI for more than one active FD beam pairs within the time gap period.

In one configuration, the SI level threshold may be preconfigured or predefined. In one configuration, the base station may signal the SI level threshold to the UE via one of a DCI message, a MAC-CE, or an RRC message. At 610, the base station 604 may transmit, to the UE 602, an SI level threshold associated with one or more measurements of a quality of one or more FD beam pairs.

In one aspect, the UE may identify the quality and status of the FD beam pairs based on both the signal quality and the SI measurements. In one aspect, the UE may identify the quality and status of the FD beam pairs based on SINRs. An SINR may be calculated based on a downlink signal quality and an SI measurement. The UE may autonomously measure the SI associated with one or more FD beam pairs, in the same way as described in detail above.

Further, the UE may measure the downlink signal quality based on a downlink reference signal. Examples of the downlink reference signal that may be used may include a latest demodulation reference signal (DMRS), a CSI-RS, or an SSB. At 612, the base station 604 may transmit, to the UE 602, at least one downlink reference signal. The UE may measure the reference signal received power (RSRP) associated with the downlink reference signal using the downlink beam of the currently active FD beam pair that is being measured. In one configuration, an RSRP associated with a CSI-RS may be measured, because the CSI-RS may be associated with a longer periodicity compared to the SI measurement. When calculating the signal quality, the transmit power may be adjusted to match the data transmit power.

In one configuration, the downlink reference signal may be a latest downlink reference signal before a corresponding time gap period. The downlink reference signal may be received from the base station within a time period of a preconfigured duration (e.g., x ms) immediately preceding the corresponding time gap period. The signal quality measurement may become stale if the downlink reference signal is received too long before the corresponding time gap period.

In one configuration, if no downlink reference signal is received from the base station within the time period of the preconfigured duration immediately preceding the corresponding time gap period, the base station may identify the quality and status of the FD beam pairs based on the SI measurements, as described above. In one configuration, the UE may receive a downlink reference signal from the base station within a time gap period.

The UE may calculate an SINR associated with a currently active FD beam pair based on the measured signal quality and the SI measurements. An SINR threshold may be used with the SINRs. If the SINR associated with an FD beam pair is above the SINR threshold, the UE may identify the FD beam pair as healthy. Otherwise, the UE may identify the FD beam pair as failed or in a substandard condition.

In one configuration, the SINR threshold may be preconfigured or predefined. In one configuration, the base station may signal the SINR threshold to the UE via one or more configured downlink reference signals during the one or more time gap periods. At 610, the base station 604 may transmit, to the UE 602, an SINR threshold associated with one or more measurements of a quality of one or more FD beam pairs.

In one aspect, the UE may indicate a failed FD beam pair to the base station. In one configuration, the UE may identify an FD beam pair as failed in response to identifying, throughout multiple time gap periods, the FD beam pair as being in a substandard condition for a preconfigured threshold number of times. At 620, the UE 602 may transmit, to the base station 604, and the base station 604 may receive, from the UE 602, an indication of the at least one failed FD beam pair. Even though an FD beam pair may be identified as failed, the failure may be due to the SI, and the UE may still use the uplink beam in the failed FD beam pair to perform uplink transmissions.

In one configuration, the UE may transmit an SR to the base station. The UE may then report the beam pair failure to the base station via the uplink transmission based on the uplink grant corresponding to the SR. The UE may also report one or more metrics associated with the beam quality measurement and/or the beam failure detection (e.g., the beam identifiers (IDs), the beam pair ID, the beam failure ID, the SI measurements, or the SINRs, etc.) to the base station via the uplink transmission based on the uplink grant. At 622, the UE 602 may transmit, to the base station 604, one or more metrics associated with at least one of the one or more measurements corresponding to the at least one failed FD beam pair.

In one configuration, the UE may report the beam pair failure to the base station via an ACK/negative ACK (HACK) (ACK/NACK) associated with a scheduled PDSCH or a PDSCH based on SPS. The UE may use one bit (which may be a new, additional bit) in the ACK/NACK to indicate whether or not an FD beam pair failure has been identified.

In one configuration, the UE may report the beam pair failure to the base station via a MAC-CE in a grant-based previously scheduled PUSCH. The UE may also report one or more metrics associated with the beam quality measurement and/or the beam failure detection (e.g., the beam IDs, the beam pair ID, the beam failure ID, the SI measurements, or the SINRs, etc.) to the base station via the MAC-CE. At 622, the UE 602 may transmit, to the base station 604, one or more metrics associated with at least one of the one or more measurements corresponding to the at least one failed FD beam pair.

In one aspect, in response to the detection of a failed FD beam pair, the UE may identify a new candidate FD beam pair, and may transmit an indication of the new candidate FD beam pair to the base station.

In one configuration, when the UE has identified an FD beam pair as failed, the UE may measure, during the time gap period, the SI associated with one or more new uplink beams and the same downlink beam in the failed FD beam pair (or other candidate SSB or CSI-RS downlink beams). In one configuration, the UE may measure, during the time gap period, the SI associated with the same uplink beam in the failed FD beam pair and one or more new downlink beams (e.g., candidate SSB or CSI-RS downlink beams). In one configuration, the UE may measure, during the time gap period, the SI associated with one or more new uplink beam and one or more new downlink beams. Accordingly, the new candidate FD beam pair may include at least one beam (uplink or downlink) that is not included in the failed FD beam pair. In one configuration, the new candidate FD beam pair may include new uplink and downlink beams neither of which is included in the failed FD beam pair. At 626, the UE 602 may identify at least one new candidate FD beam pair based on one or more SI measurements performed during the one or more time gap periods.

In one configuration, the UE may transmit an indication of the new candidate FD beam pair to the base station via an uplink transmission based on an uplink grant corresponding to an SR. In one configuration, the UE may transmit an indication of the new candidate FD beam pair to the base station via a MAC-CE in a grant-based previously scheduled PUSCH. At 628, the UE 602 may transmit, to the base station 604, and the base station 604 may receive, from the UE 602, an indication of the at least one new candidate FD beam pair.

The measurement of the new candidate FD beam pair may be based on SI measurements. If an SINR is to be calculated, the UE may measure an RSRP associated with a downlink reference signal (e.g., the SSB or the CSI-RS associated with the candidate SSB or CSI-RS downlink beams). The SINR may be calculated based on the SI measurements and the downlink RSRP measurements.

In one aspect, in response to receiving the indication of a failed FD beam pair, the base station may configure resources for measuring at the UE the SINR of new candidate FD beam pairs and for reporting the SINR measurements, such that the UE may find and identify one or more new candidate FD beam pairs. At 624, the base station 604 may transmit, to the UE 602, an indication of a resource configuration for an FD beam management procedure associated with selection of at least one new candidate FD beam pair. In particular, the UE 602 may use the configured downlink and uplink resources to measure at least one of the SI level associated with one or more candidate FD beam pairs or the RSRP associated with one or more downlink beams in the one or more candidate FD beam pairs in order to select at least one new candidate FD beam pair based on the measured SI level or the measured RSRP.

In one aspect, subsequent to identifying a failed FD beam pair, the UE may perform a beam recovery random access channel (RACH) procedure.

Figure 7:
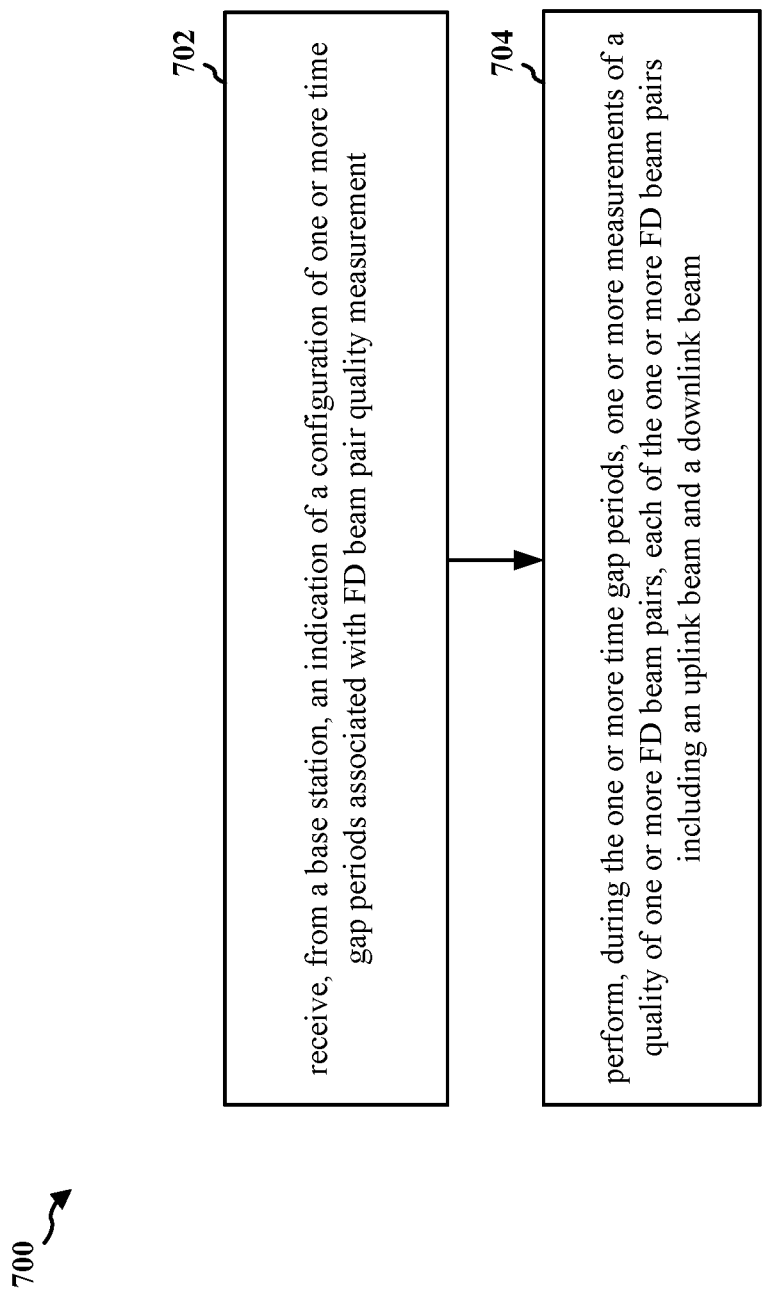
FIG. 7 is a flowchart of a method of wireless communication.

FIG. 7 is a flowchart 700 of a method of wireless communication. The method may be performed by a UE (e.g., the UE 104/350/602; the apparatus 1102). At 702, the UE may receive, from a base station, an indication of a configuration of one or more time gap periods associated with FD beam pair quality measurement. For example, 702 may be performed by the FD beam management component 1140 in FIG. 11. Referring to FIG. 6, at 608, the UE 602 may receive, from a base station 604, an indication of a configuration of one or more time gap periods associated with FD beam pair quality measurement.

At 704, the UE may perform, during the one or more time gap periods, one or more measurements of a quality of one or more FD beam pairs, each of the one or more FD beam pairs including an uplink beam and a downlink beam. For example, 704 may be performed by the FD beam management component 1140 in FIG. 11. Referring to FIG. 6, at 614, the UE 602 may perform, during the one or more time gap periods, one or more measurements of a quality of one or more FD beam pairs, each of the one or more FD beam pairs including an uplink beam and a downlink beam.

Figure 8:
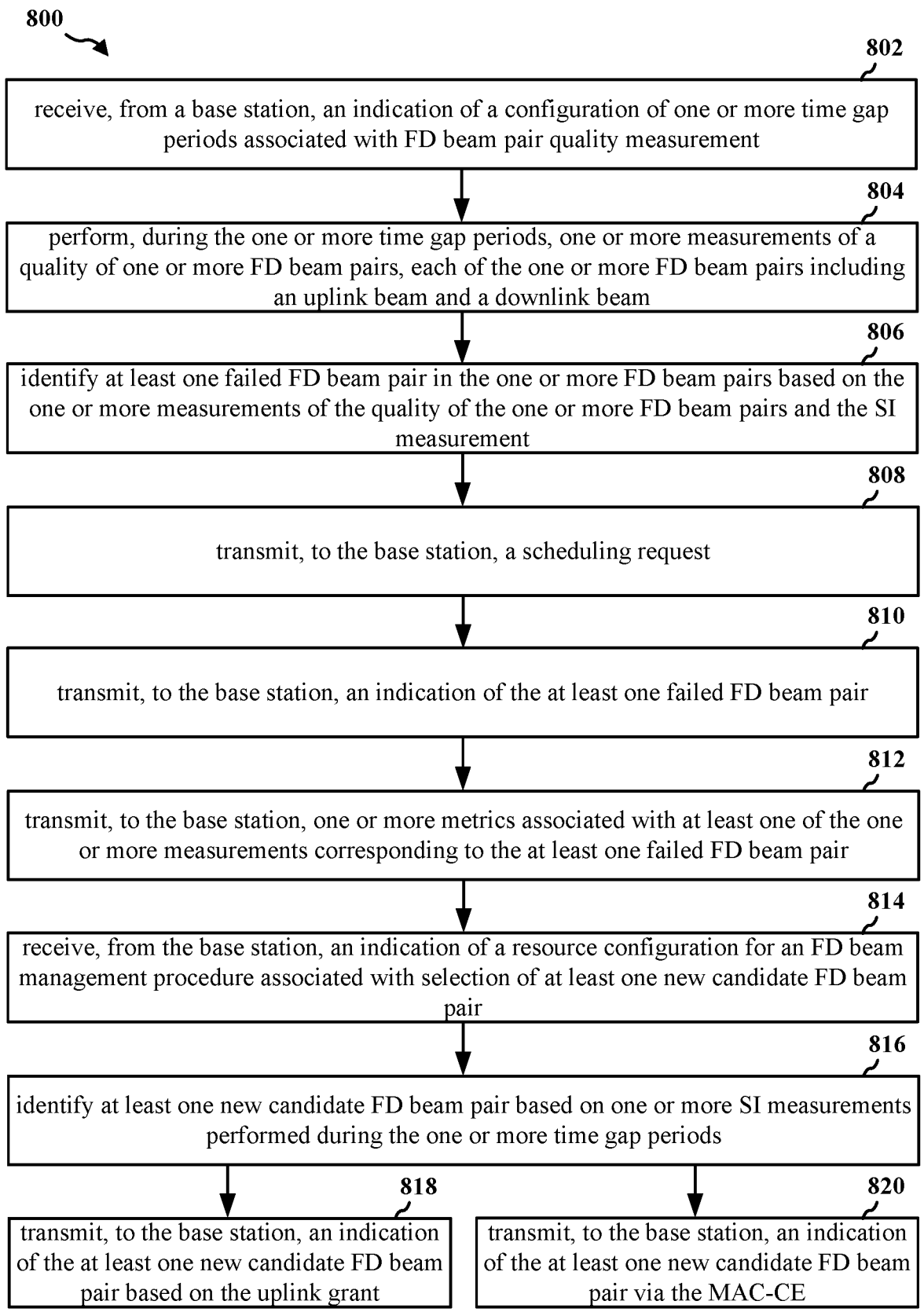
FIG. 8 is a flowchart of a method of wireless communication.

FIG. 8 is a flowchart 800 of a method of wireless communication. The method may be performed by a UE (e.g., the UE 104/350/602; the apparatus 1102). At 802, the UE may receive, from a base station, an indication of a configuration of one or more time gap periods associated with FD beam pair quality measurement. For example, 802 may be performed by the FD beam management component 1140 in FIG. 11. Referring to FIG. 6, at 608, the UE 602 may receive, from a base station 604, an indication of a configuration of one or more time gap periods associated with FD beam pair quality measurement.

At 804, the UE may perform, during the one or more time gap periods, one or more measurements of a quality of one or more FD beam pairs. Each of the one or more FD beam pairs may include an uplink beam and a downlink beam. For example, 804 may be performed by the FD beam management component 1140 in FIG. 11. Referring to FIG. 6, at 614, the UE 602 may perform, during the one or more time gap periods, one or more measurements of a quality of one or more FD beam pairs.

In one configuration, the one or more time gap periods may be aperiodic.

In one configuration, the one or more time gap periods may be periodic or semi-persistent.

In one configuration, the one or more time gap periods may be specific to the UE.

In one configuration, the one or more time gap periods may be specific to a group of UEs including the UE.

In one configuration, the indication of the configuration of the one or more time gap periods may be received from the base station via one of a DCI message, a MAC-CE, or an RRC message.

In one configuration, the one or more measurements of the quality of the one or more FD beam pairs may include an SI measurement.

In one configuration, the SI measurement may be performed for a first FD beam pair of the one or more FD beam pairs when the UE transmits an uplink reference signal via an uplink beam of the first FD beam pair and receives one or more messages or signals via a downlink beam of the first FD beam pair.

In one configuration, an SI level threshold associated with the SI measurement may be preconfigured.

In one configuration, an indication of an SI level threshold associated with the SI measurement may be received from the base station via one of a DCI message, a MAC-CE, or an RRC message.

In one configuration, the one or more measurements of the quality of the one or more FD beam pairs may further include one or more signal quality measurements.

In one configuration, the one or more signal quality measurements may include a downlink signal quality measurement based on at least one downlink reference signal.

In one configuration, the at least one downlink reference signal may include one of a DMRS, a CSI-RS, or an SSB.

In one configuration, the at least one downlink reference signal may be a latest downlink reference signal before a corresponding time gap period of the one or more time gap periods. The at least one downlink reference signal may be received from the base station within a time period of a preconfigured duration immediately preceding the corresponding time gap period.

In one configuration, the at least one downlink reference signal may be received from the base station during at least one of the one or more time gap periods.

In one configuration, an indication of an SINR threshold associated with the SI measurement and the one or more signal quality measurements may be received via one or more configured downlink reference signals during the one or more time gap periods.

In one configuration, at 806, the UE may identify at least one failed FD beam pair in the one or more FD beam pairs based on the one or more measurements of the quality of the one or more FD beam pairs and an SI measurement. For example, 806 may be performed by the FD beam management component 1140 in FIG. 11. Referring to FIG. 6, at 616, the UE 602 may identify at least one failed FD beam pair in the one or more FD beam pairs based on the one or more measurements of the quality of the one or more FD beam pairs and an SI measurement. At 810, the UE may transmit, to the base station, an indication of the at least one failed FD beam pair. For example, 810 may be performed by the FD beam management component 1140 in FIG. 11. Referring to FIG. 6, at 620, the UE 602 may transmit, to the base station 604, an indication of the at least one failed FD beam pair.

In one configuration, at 808, the UE may transmit, to the base station, a scheduling request. The indication of the at least one failed FD beam pair may be transmitted to the base station based on an uplink grant associated with the scheduling request. For example, 808 may be performed by the FD beam management component 1140 in FIG. 11. Referring to FIG. 6, at 618, the UE 602 may transmit, to the base station 604, a scheduling request.

In one configuration, at 816, the UE may identify at least one new candidate FD beam pair based on one or more SI measurements performed during the one or more time gap periods. For example, 816 may be performed by the FD beam management component 1140 in FIG. 11. Referring to FIG. 6, at 626, the UE 602 may identify at least one new candidate FD beam pair based on one or more SI measurements performed during the one or more time gap periods. At 818, the UE may transmit, to the base station, an indication of the at least one new candidate FD beam pair based on the uplink grant. For example, 818 may be performed by the FD beam management component 1140 in FIG. 11. Referring to FIG. 6, at 628, the UE 602 may transmit, to the base station 604, an indication of the at least one new candidate FD beam pair based on the uplink grant.

In one configuration, the at least one new candidate FD beam pair may include at least one beam that is not associated with the at least one failed FD beam pair, and may include an uplink beam that corresponds to one of a new uplink beam, or an uplink beam associated with the at least one failed FD beam pair, and a downlink beam that corresponds to one of a new downlink beam, a downlink beam associated with the at least one failed FD beam pair, a downlink beam associated with an SSB, or a downlink beam associated with a CSI-RS.

In one configuration, the indication of the at least one failed FD beam pair may be transmitted to the base station via an ACK/NACK associated with a scheduled PDSCH.

In one configuration, the indication of the at least one failed FD beam pair may be transmitted to the base station via a MAC-CE associated with a scheduled PUSCH grant.

In one configuration, at 816, the UE may identify at least one new candidate FD beam pair based on one or more SI measurements performed during the one or more time gap periods. For example, 816 may be performed by the FD beam management component 1140 in FIG. 11. Referring to FIG. 6, at 626, the UE 602 may identify at least one new candidate FD beam pair based on one or more SI measurements performed during the one or more time gap periods. At 820, the UE may transmit, to the base station, an indication of the at least one new candidate FD beam pair via the MAC-CE. For example, 820 may be performed by the FD beam management component 1140 in FIG. 11. Referring to FIG. 6, at 628, the UE 602 may transmit, to the base station 604, an indication of the at least one new candidate FD beam pair via the MAC-CE.

In one configuration, at 812, the UE may transmit, to the base station, one or more metrics associated with at least one of the one or more measurements corresponding to the at least one failed FD beam pair. For example, 812 may be performed by the FD beam management component 1140 in FIG. 11. Referring to FIG. 6, at 622, the UE 602 may transmit, to the base station 604, one or more metrics associated with at least one of the one or more measurements corresponding to the at least one failed FD beam pair.

In one configuration, at 814, the UE may receive, from the base station, an indication of a resource configuration for an FD beam management procedure associated with selection of at least one new candidate FD beam pair. For example, 814 may be performed by the FD beam management component 1140 in FIG. 11. Referring to FIG. 6, at 624, the UE 602 may receive, from the base station 604, an indication of a resource configuration for an FD beam management procedure associated with selection of at least one new candidate FD beam pair.

Figure 9:
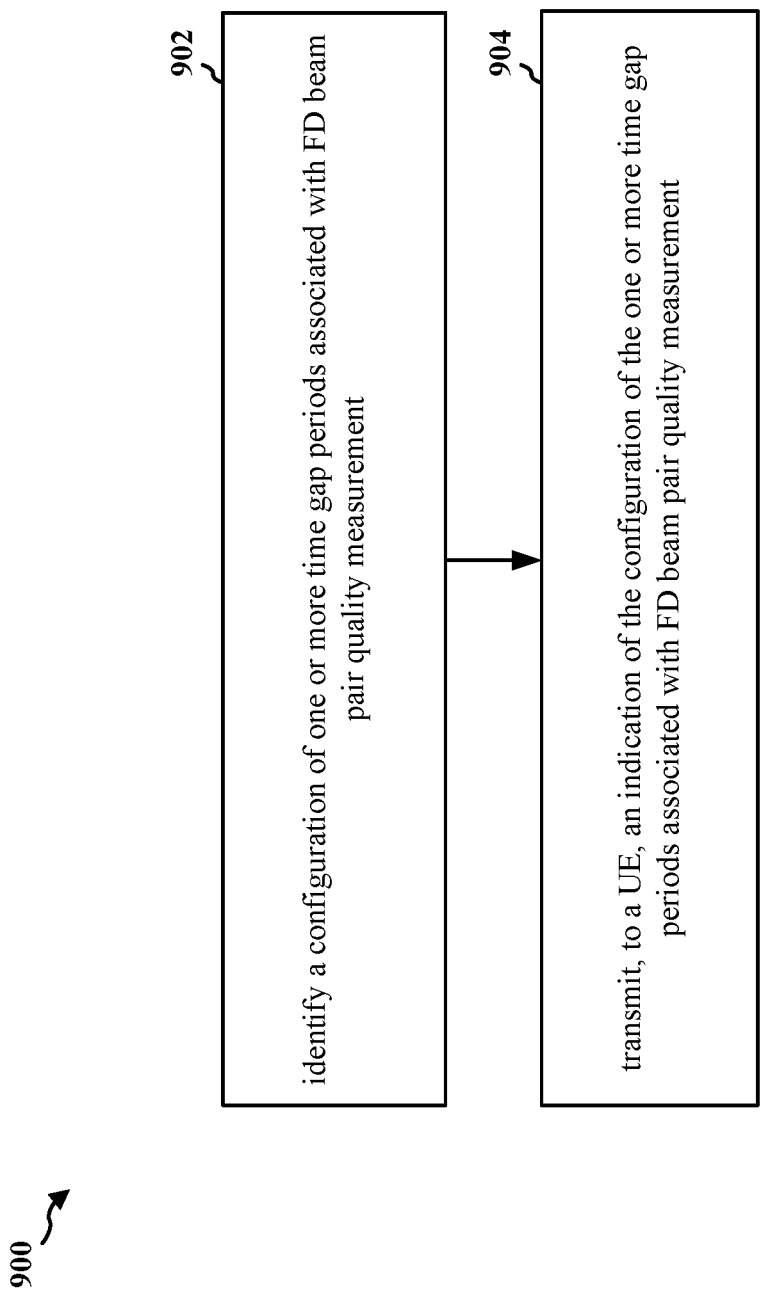
FIG. 9 is a flowchart of a method of wireless communication.

FIG. 9 is a flowchart 900 of a method of wireless communication. The method may be performed by a base station (e.g., the base station 102/180/310/604; the apparatus 1202). At 902, the base station may identify a configuration of one or more time gap periods associated with FD beam pair quality measurement. For example, 902 may be performed by the FD beam management component 1240 in FIG. 12. Referring to FIG. 6, at 606, the base station 604 may identify a configuration of one or more time gap periods associated with FD beam pair quality measurement.

At 904, the base station may transmit, to a UE, an indication of the configuration of the one or more time gap periods associated with FD beam pair quality measurement. For example, 904 may be performed by the FD beam management component 1240 in FIG. 12. Referring to FIG. 6, at 608, the base station 604 may transmit, to a UE 602, an indication of the configuration of the one or more time gap periods associated with FD beam pair quality measurement.

Figure 10:
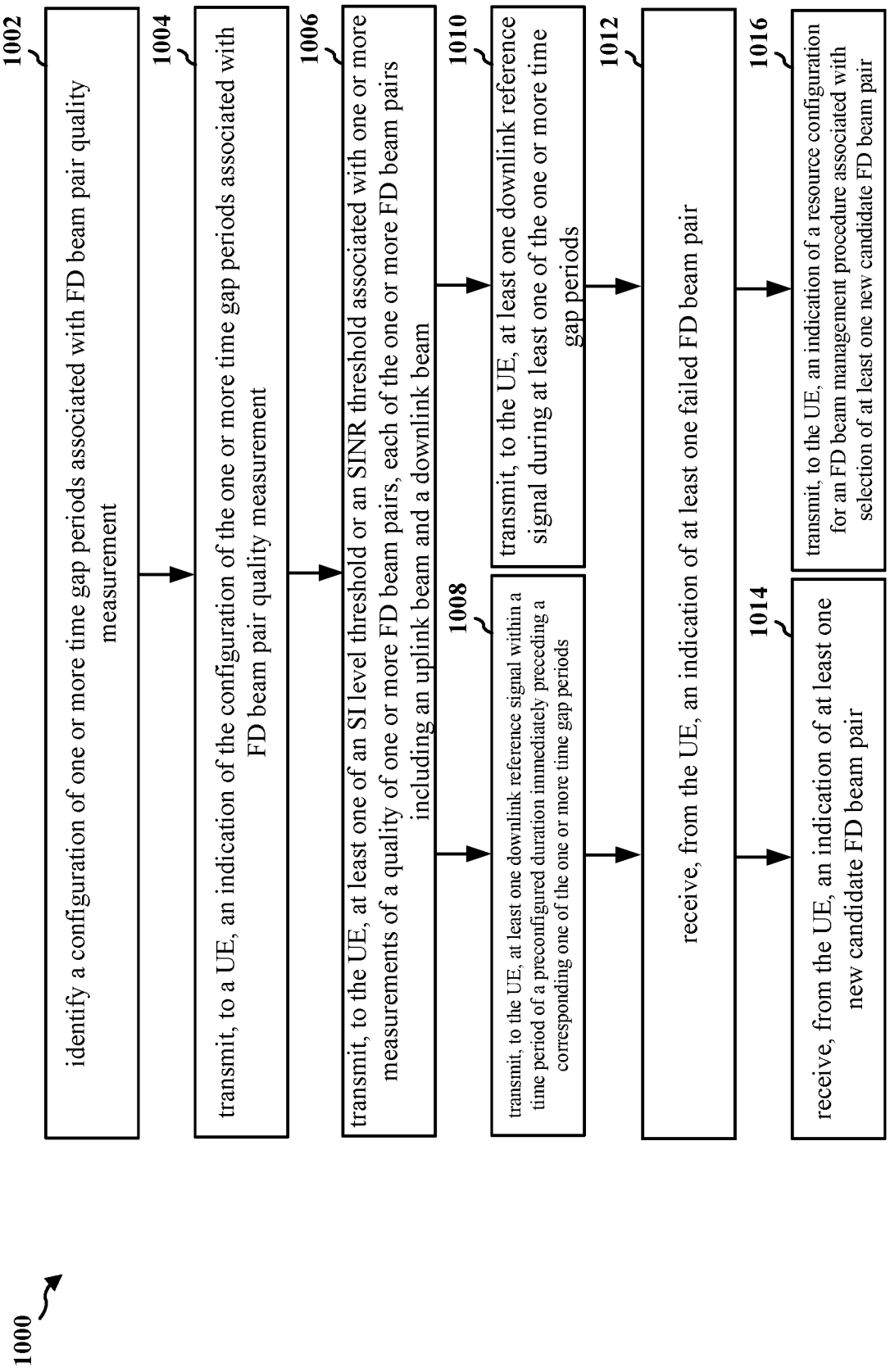
FIG. 10 is a flowchart of a method of wireless communication.

FIG. 10 is a flowchart 1000 of a method of wireless communication. The method may be performed by a base station (e.g., the base station 102/180/310/604; the apparatus 1202). At 1002, the base station may identify a configuration of one or more time gap periods associated with FD beam pair quality measurement. For example, 1002 may be performed by the FD beam management component 1240 in FIG. 12. Referring to FIG. 6, at 606, the base station 604 may identify a configuration of one or more time gap periods associated with FD beam pair quality measurement.

At 1004, the base station may transmit, to a UE, an indication of the configuration of the one or more time gap periods associated with FD beam pair quality measurement. For example, 1004 may be performed by the FD beam management component 1240 in FIG. 12. Referring to FIG. 6, at 608, the base station 604 may transmit, to a UE 602, an indication of the configuration of the one or more time gap periods associated with FD beam pair quality measurement.

In one configuration, at 1006, the base station may transmit, to the UE, at least one of an SI level threshold or an SINR threshold associated with one or more measurements of a quality of one or more FD beam pairs. Each of the one or more FD beam pairs may include an uplink beam and a downlink beam. For example, 1006 may be performed by the FD beam management component 1240 in FIG. 12. Referring to FIG. 6, at 610, the base station 604 may transmit, to the UE 602, at least one of an SI level threshold or an SINR threshold associated with one or more measurements of a quality of one or more FD beam pairs.

In one configuration, at 1012, the base station may receive, from the UE, an indication of at least one failed FD beam pair. For example, 1012 may be performed by the FD beam management component 1240 in FIG. 12. Referring to FIG. 6, at 620, the base station 604 may receive, from the UE 602, an indication of at least one failed FD beam pair.

In one configuration, at 1014, the base station may receive, from the UE, an indication of at least one new candidate FD beam pair. For example, 1014 may be performed by the FD beam management component 1240 in FIG. 12. Referring to FIG. 6, at 628, the base station 604 may receive, from the UE 602, an indication of at least one new candidate FD beam pair.

In one configuration, at 1016, the base station may transmit, to the UE, an indication of a resource configuration for an FD beam management procedure associated with selection of at least one new candidate FD beam pair. For example, 1016 may be performed by the FD beam management component 1240 in FIG. 12. Referring to FIG. 6, at 624, the base station 604 may transmit, to the UE 602, an indication of a resource configuration for an FD beam management procedure associated with selection of at least one new candidate FD beam pair.

In one configuration, at 1008, the base station may transmit, to the UE, at least one downlink reference signal within a time period of a preconfigured duration immediately preceding a corresponding one of the one or more time gap periods. For example, 1008 may be performed by the FD beam management component 1240 in FIG. 12. Referring to FIG. 6, at 612, the base station 604 may transmit, to the UE 602, at least one downlink reference signal within a time period of a preconfigured duration immediately preceding a corresponding one of the one or more time gap periods.

In one configuration, at 1010, the base station may transmit, to the UE, at least one downlink reference signal during at least one of the one or more time gap periods. For example, 1010 may be performed by the FD beam management component 1240 in FIG. 12. Referring to FIG. 6, at 612, the base station 604 may transmit, to the UE 602, at least one downlink reference signal during at least one of the one or more time gap periods.

Figure 11:
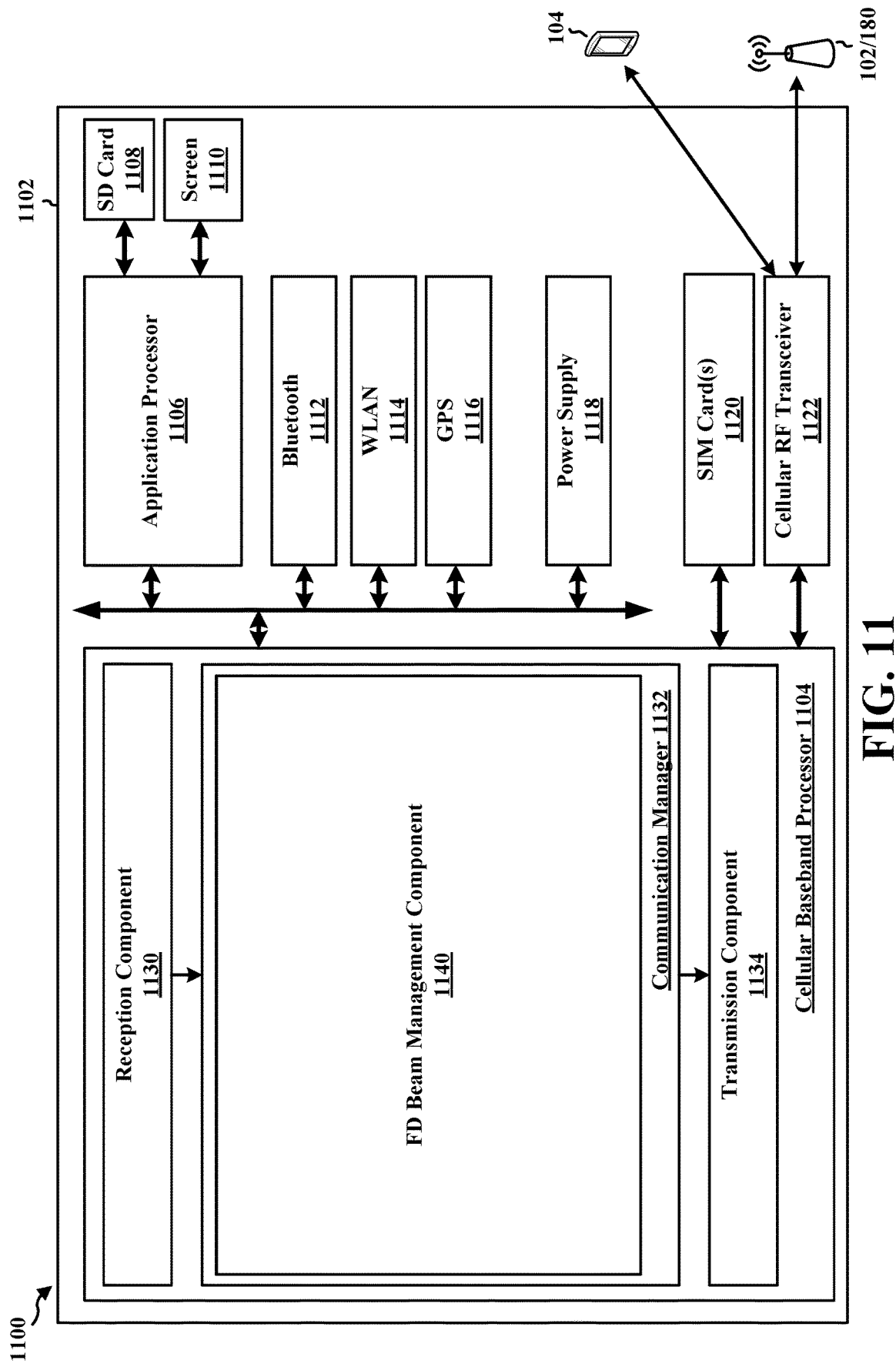
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/ memory. The computer-readable medium/memory may be non-transitory. The cellular baseband processor 1104 is responsible for general processing, including the execution of software stored on the computer-readable medium/ memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an FD beam management component 1140 that may be configured to receive, from a base station, an indication of a configuration of one or more time gap periods associated with FD beam pair quality measurement, e.g., as described in connection with 702 in FIG. 7 and 802 in FIG. 8. The FD beam management component 1140 may be configured to perform, during the one or more time gap periods, one or more measurements of a quality of one or more FD beam pairs, e.g., as described in connection with 704 in FIGS. 7 and 804 in FIG. 8. The FD beam management component 1140 may be configured to identify at least one failed FD beam pair in the one or more FD beam pairs based on the one or more measurements of the quality of the one or more FD beam pairs and an SI measurement, e.g., as described in connection with 806 in FIG. 8. The FD beam management component 1140 may be configured to transmit, to the base station, a scheduling request. The indication of the at least one failed FD beam pair may be transmitted to the base station based on an uplink grant associated with the scheduling request, e.g., as described in connection with 808 in FIG. 8. The FD beam management component 1140 may be configured to transmit, to the base station, an indication of the at least one failed FD beam pair, e.g., as described in connection with 810 in FIG. 8. The FD beam management component 1140 may be configured to transmit, to the base station, one or more metrics associated with at least one of the one or more measurements corresponding to the at least one failed FD beam pair, e.g., as described in connection with 812 in FIG. 8. The FD beam management component 1140 may be configured to receive, from the base station, an indication of a resource configuration for an FD beam management procedure associated with selection of at least one new candidate FD beam pair, e.g., as described in connection with 814 in FIG. 8. The FD beam management component 1140 may be configured to identify at least one new candidate FD beam pair based on one or more SI measurements performed during the one or more time gap periods, e.g., as described in connection with 816 in FIG. 8. The FD beam management component 1140 may be configured to transmit, to the base station, an indication of the at least one new candidate FD beam pair based on the uplink grant, e.g., as described in connection with 818 in FIG. 8. The FD beam management component 1140 may be configured to transmit, to the base station, an indication of the at least one new candidate FD beam pair via the MAC-CE, e.g., as described in connection with 820 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, an indication of a configuration of one or more time gap periods associated with FD beam pair quality measurement. The apparatus 1102 may include means for performing, during the one or more time gap periods, one or more measurements of a quality of one or more FD beam pairs, each of the one or more FD beam pairs including an uplink beam and a downlink beam.

In one configuration, the one or more time gap periods may be aperiodic. In one configuration, the one or more time gap periods may be periodic or semi-persistent. In one configuration, the one or more time gap periods may be specific to the UE. In one configuration, the one or more time gap periods may be specific to a group of UEs including the UE. In one configuration, the indication of the configuration of the one or more time gap periods may be received from the base station via one of a DCI message, a MAC-CE, or an RRC message. In one configuration, the one or more measurements of the quality of the one or more FD beam pairs may include an SI measurement. In one configuration, the SI measurement may be performed for a first FD beam pair of the one or more FD beam pairs when the UE transmits an uplink reference signal via an uplink beam of the first FD beam pair and receives one or more messages or signals via a downlink beam of the first FD beam pair. In one configuration, an SI level threshold associated with the SI measurement may be preconfigured. In one configuration, an indication of an SI level threshold associated with the SI measurement may be received from the base station via one of a DCI message, a MAC-CE, or an RRC message. In one configuration, the one or more measurements of the quality of the one or more FD beam pairs may further include one or more signal quality measurements. In one configuration, the one or more signal quality measurements may include a downlink signal quality measurement based on at least one downlink reference signal. In one configuration, the at least one downlink reference signal may include one of a DMRS, a CSI-RS, or an SSB. In one configuration, the at least one downlink reference signal may be a latest downlink reference signal before a corresponding time gap period of the one or more time gap periods. The at least one downlink reference signal may be received from the base station within a time period of a preconfigured duration immediately preceding the corresponding time gap period. In one configuration, the at least one downlink reference signal may be received from the base station during at least one of the one or more time gap periods. In one configuration, an indication of an SINR threshold associated with the SI measurement and the one or more signal quality measurements may be received from the base station via one or more configured downlink reference signals during the one or more time gap periods. In one configuration, the apparatus 1102 may include means for identifying at least one failed FD beam pair in the one or more FD beam pairs based on the one or more measurements of the quality of the one or more FD beam pairs and an SI measurement. The apparatus 1102 may include means for transmitting, to the base station, an indication of the at least one failed FD beam pair. In one configuration, the apparatus 1102 may include means for transmitting, to the base station, a scheduling request. The indication of the at least one failed FD beam pair may be transmitted to the base station based on an uplink grant associated with the scheduling request. In one configuration, the apparatus 1102 may include means for identifying at least one new candidate FD beam pair based on one or more SI measurements performed during the one or more time gap periods. The apparatus 1102 may include means for transmitting, to the base station, an indication of the at least one new candidate FD beam pair based on the uplink grant. In one configuration, the at least one new candidate FD beam pair may include at least one beam that is not associated with the at least one failed FD beam pair, and may include an uplink beam that corresponds to one of a new uplink beam, or an uplink beam associated with the at least one failed FD beam pair, and a downlink beam that corresponds to one of a new downlink beam, a downlink beam associated with the at least one failed FD beam pair, a downlink beam associated with an SSB, or a downlink beam associated with a CSI-RS. In one configuration, the indication of the at least one failed FD beam pair may be transmitted to the base station via an ACK/NACK associated with a scheduled PDSCH. In one configuration, the indication of the at least one failed FD beam pair may be transmitted to the base station via a MAC-CE associated with a scheduled PUSCH grant. In one configuration, the apparatus 1102 may include means for identifying at least one new candidate FD beam pair based on one or more SI measurements performed during the one or more time gap periods. The apparatus 1102 may include means for transmitting, to the base station, an indication of the at least one new candidate FD beam pair via the MAC-CE. In one configuration, the apparatus 1102 may include means for transmitting, to the base station, one or more metrics associated with at least one of the one or more measurements corresponding to the at least one failed FD beam pair. In one configuration, the apparatus 1102 may include means for receiving, from the base station, an indication of a resource configuration for an FD beam management procedure associated with selection of at least one new candidate FD beam pair.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
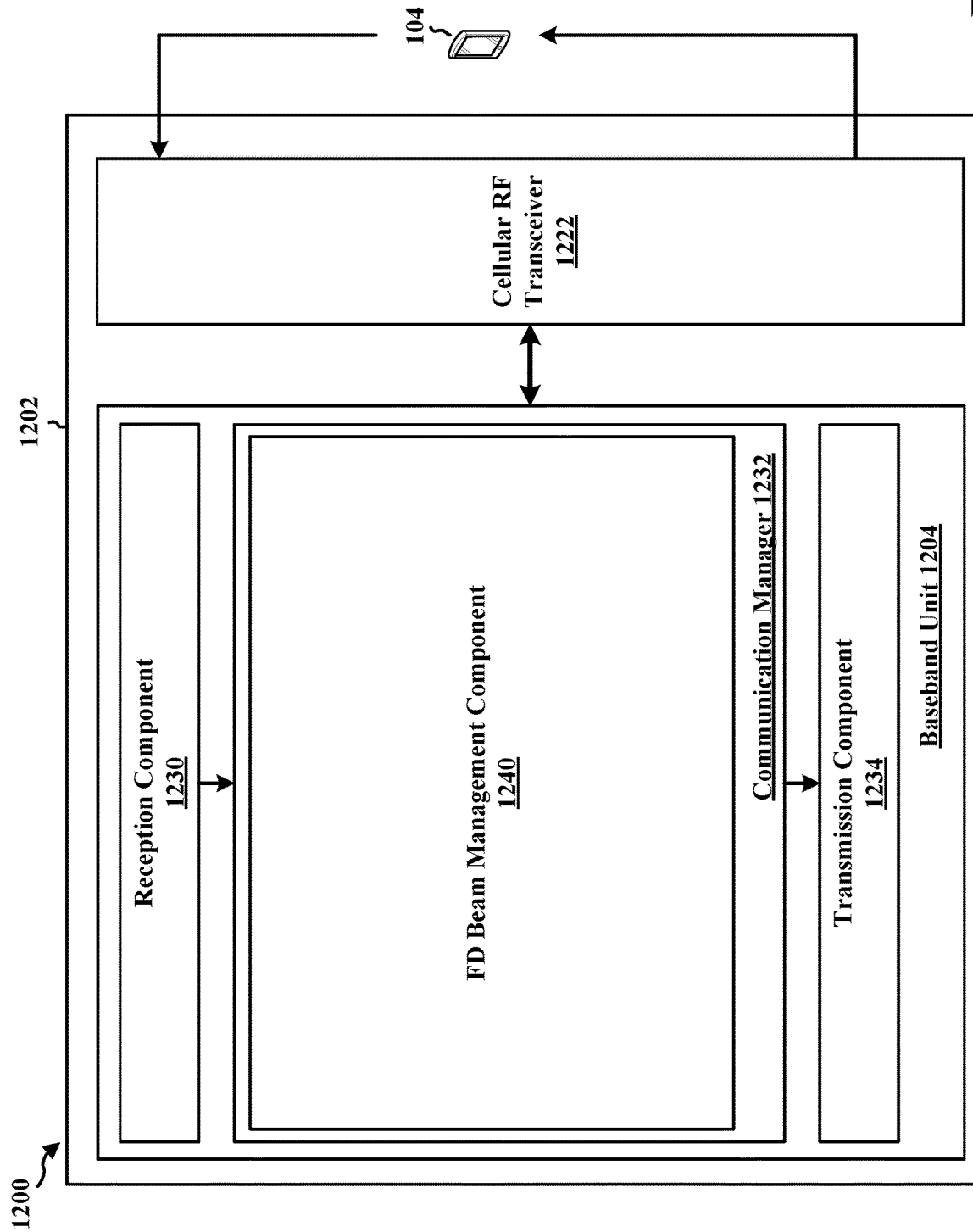
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an FD beam management component 1240 that may be configured to identify a configuration of one or more time gap periods associated with FD beam pair quality measurement, e.g., as described in connection with 902 in FIGS. 9 and 1002 in FIG. 10. The FD beam management component 1240 may be configured to transmit, to a UE, an indication of the configuration of the one or more time gap periods associated with FD beam pair quality measurement, e.g., as described in connection with 904 in FIG. 9 and 1004 in FIG. 10. The FD beam management component 1240 may be configured to transmit, to the UE, at least one of an SI level threshold or an SINR threshold associated with one or more measurements of a quality of one or more FD beam pairs, e.g., as described in connection with 1006 in FIG. 10. The FD beam management component 1240 may be configured to transmit, to the UE, at least one downlink reference signal within a time period of a preconfigured duration immediately preceding a corresponding one of the one or more time gap periods, e.g., as described in connection with 1008 in FIG. 10. The FD beam management component 1240 may be configured to transmit, to the UE, at least one downlink reference signal during at least one of the one or more time gap periods, e.g., as described in connection with 1010 in FIG. 10. The FD beam management component 1240 may be configured to receive, from the UE, an indication of at least one failed FD beam pair, e.g., as described in connection with 1012 in FIG. 10. The FD beam management component 1240 may be configured to receive, from the UE, an indication of at least one new candidate FD beam pair, e.g., as described in connection with 1014 in FIG. 10. The FD beam management component 1240 may be configured to transmit, to the UE, an indication of a resource configuration for an FD beam management procedure associated with selection of at least one new candidate FD beam pair, e.g., as described in connection with 1016 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for identifying a configuration of one or more time gap periods associated with FD beam pair quality measurement. The apparatus 1202 may include means for transmitting, to a UE, an indication of the configuration of the one or more time gap periods associated with FD beam pair quality measurement.

In one configuration, the apparatus 1202 may include means for transmitting, to the UE, at least one of an SI level threshold or an SINR threshold associated with one or more measurements of a quality of one or more FD beam pairs. Each of the one or more FD beam pairs may include an uplink beam and a downlink beam. In one configuration, the apparatus 1202 may include means for receiving, from the UE, an indication of at least one failed FD beam pair. In one configuration, the apparatus 1202 may include means for receiving, from the UE, an indication of at least one new candidate FD beam pair. In one configuration, the apparatus 1202 may include means for transmitting, to the UE, an indication of a resource configuration for an FD beam management procedure associated with selection of at least one new candidate FD beam pair. In one configuration, the apparatus 1202 may include means for transmitting, to the UE, at least one downlink reference signal within a time period of a preconfigured duration immediately preceding a corresponding one of the one or more time gap periods. In one configuration, the apparatus 1202 may include means for transmitting, to the UE, at least one downlink reference signal during at least one of the one or more time gap periods.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, a base station may identify a configuration of one or more time gap periods associated with FD beam pair quality measurement. The base station may transmit, to the UE, and the UE may receive, from the base station, an indication of the configuration of the one or more time gap periods associated with FD beam pair quality measurement. The UE may perform, during the one or more time gap periods, one or more measurements of a quality of one or more FD beam pairs. Each of the one or more FD beam pairs may include an uplink beam and a downlink beam. Accordingly, an FD beam pair failure may be properly identified by the UE between two beam management cycles, which may be separated by a relatively long period of time. The negative impact to FD transmissions caused by the FD beam pair failure may thus be reduced or minimized.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, an indication of a configuration of one or more time gap periods associated with FD beam pair quality measurement; and perform, during the one or more time gap periods, one or more measurements of a quality of one or more FD beam pairs, each of the one or more FD beam pairs including an uplink beam and a downlink beam.

Aspect 2 is the apparatus of aspect 1, where the one or more time gap periods are aperiodic.

Aspect 3 is the apparatus of aspect 1, where the one or more time gap periods are periodic or semi-persistent.

Aspect 4 is the apparatus of aspect 1, where the one or more time gap periods are specific to the UE.

Aspect 5 is the apparatus of aspect 1, where the one or more time gap periods are specific to a group of UEs including the UE.

Aspect 6 is the apparatus of any of aspects 1 to 5, where the indication of the configuration of the one or more time gap periods is received from the base station via one of a DCI message, a MAC-CE, or an RRC message.

Aspect 7 is the apparatus of any of aspects 1 to 6, where the one or more measurements of the quality of the one or more FD beam pairs include an SI measurement.

Aspect 8 is the apparatus of aspect 7, where the SI measurement is performed for a first FD beam pair of the one or more FD beam pairs when the UE transmits an uplink reference signal via an uplink beam of the first FD beam pair and receives one or more messages or signals via a downlink beam of the first FD beam pair.

Aspect 9 is the apparatus of any of aspects 7 and 8, where an SI level threshold associated with the SI measurement is preconfigured.

Aspect 10 is the apparatus of any of aspects 7 and 8, where an indication of an SI level threshold associated with the SI measurement is received from the base station via one of a DCI message, a MAC-CE, or an RRC message.

Aspect 11 is the apparatus of any of aspects 7 to 10, where the one or more measurements of the quality of the one or more FD beam pairs further include one or more signal quality measurements.

Aspect 12 is the apparatus of aspect 11, where the one or more signal quality measurements include a downlink signal quality measurement based on at least one downlink reference signal.

Aspect 13 is the apparatus of aspect 12, where the at least one downlink reference signal includes one of a DMRS, a CSI-RS, or an SSB.

Aspect 14 is the apparatus of any of aspects 12 and 13, where the at least one downlink reference signal is a latest downlink reference signal before a corresponding time gap period of the one or more time gap periods, and the at least one downlink reference signal is received from the base station within a time period of a preconfigured duration immediately preceding the corresponding time gap period.

Aspect 15 is the apparatus of any of aspects 12 and 13, where the at least one downlink reference signal is received from the base station during at least one of the one or more time gap periods.

Aspect 16 is the apparatus of any of aspects 11 to 15, where an indication of an SINR threshold associated with the SI measurement and the one or more signal quality measurements is received from the base station via one or more configured downlink reference signals during the one or more time gap periods.

Aspect 17 is the apparatus of any of aspects 1 to 16, the at least one processor being further configured to: identify at least one failed FD beam pair in the one or more FD beam pairs based on the one or more measurements of the quality of the one or more FD beam pairs and an SI measurement; and transmit, to the base station, an indication of the at least one failed FD beam pair.

Aspect 18 is the apparatus of aspect 17, the at least one processor being further configured to: transmit, to the base station, a scheduling request, where the indication of the at least one failed FD beam pair is transmitted to the base station based on an uplink grant associated with the scheduling request.

Aspect 19 is the apparatus of aspect 18, the at least one processor being further configured to: identify at least one new candidate FD beam pair based on one or more SI measurements performed during the one or more time gap periods; and transmit, to the base station, an indication of the at least one new candidate FD beam pair based on the uplink grant.

Aspect 20 is the apparatus of aspect 19, where the at least one new candidate FD beam pair includes at least one beam that is not associated with the at least one failed FD beam pair, and includes an uplink beam that corresponds to one of a new uplink beam, or an uplink beam associated with the at least one failed FD beam pair, and a downlink beam that corresponds to one of a new downlink beam, a downlink beam associated with the at least one failed FD beam pair, a downlink beam associated with an SSB, or a downlink beam associated with a CSI-RS.

Aspect 21 is the apparatus of aspect 17, where the indication of the at least one failed FD beam pair is transmitted to the base station via an ACK/NACK associated with a scheduled PDSCH.

Aspect 22 is the apparatus of aspect 17, where the indication of the at least one failed FD beam pair is transmitted to the base station via a MAC-CE associated with a scheduled PUSCH grant.

Aspect 23 is the apparatus of aspect 22, the at least one processor being further configured to: identify at least one new candidate FD beam pair based on one or more SI measurements performed during the one or more time gap periods; and transmit, to the base station, an indication of the at least one new candidate FD beam pair via the MAC-CE.

Aspect 24 is the apparatus of any of aspects 17 to 20, 22, and 23, the at least one processor being further configured to: transmit, to the base station, one or more metrics associated with at least one of the one or more measurements corresponding to the at least one failed FD beam pair.

Aspect 25 is the apparatus of any of aspects 17, 18, 21, and 22, the at least one processor being further configured to: receive, from the base station, an indication of a resource configuration for an FD beam management procedure associated with selection of at least one new candidate FD beam pair.

Aspect 26 is the apparatus of any of aspects 1 to 25, further including a transceiver coupled to the at least one processor.

Aspect 27 is an apparatus for wireless communication at a UE including at least one processor coupled to a memory and configured to identify a configuration of one or more time gap periods associated with FD beam pair quality measurement; and transmit, to a UE, an indication of the configuration of the one or more time gap periods associated with FD beam pair quality measurement.

Aspect 28 is the apparatus of aspect 27, the at least one processor being further configured to: transmit, to the UE, at least one of an SI level threshold or an SINR threshold associated with one or more measurements of a quality of one or more FD beam pairs, each of the one or more FD beam pairs including an uplink beam and a downlink beam.

Aspect 29 is the apparatus of any of aspects 27 and 28, the at least one processor being further configured to: receive, from the UE, an indication of at least one failed FD beam pair.

Aspect 30 is the apparatus of any of aspects 27 to 29, the at least one processor being further configured to: receive, from the UE, an indication of at least one new candidate FD beam pair.

Aspect 31 is the apparatus of any of aspects 27 to 29, the at least one processor being further configured to: transmit, to the UE, an indication of a resource configuration for an FD beam management procedure associated with selection of at least one new candidate FD beam pair.

Aspect 32 is the apparatus of any of aspects 27 to 31, the at least one processor being further configured to: transmit, to the UE, at least one downlink reference signal within a time period of a preconfigured duration immediately preceding a corresponding one of the one or more time gap periods.

Aspect 33 is the apparatus of any of aspects 27 to 31, the at least one processor being further configured to: transmit, to the UE, at least one downlink reference signal during at least one of the one or more time gap periods.

Aspect 34 is the apparatus of any of aspects 27 to 33, further including a transceiver coupled to the at least one processor.

Aspect 35 is a method of wireless communication for implementing any of aspects 1 to 34.

Aspect 36 is an apparatus for wireless communication including means for implementing any of aspects 1 to 34.

Aspect 37 is a computer-readable medium storing computer executable code, where the code when executed by a processor causes the processor to implement any of aspects 1 to 34.

What is claimed is:

1. An apparatus for wireless communication at a user equipment (UE), comprising:
   memory; and at least one processor coupled to the memory and configured to:
   receive, from a base station, an indication of a configuration of one or more time gap periods associated with full duplex (FD) beam pair quality measurement;
   perform, during the one or more time gap periods, one or more measurements of a quality of one or more FD beam pairs for a calibration of the one or more FD beam pairs, the one or more FD beam pairs being currently active, each of the one or more FD beam pairs comprising an uplink beam and a downlink beam; and
   determine whether a transmission configuration indicator (TCI) state associated with each of the one or more FD beam pairs is outdated based on the one or more measurements of a level indicating a self-interference (SI) above an SI level threshold.

2. The apparatus of claim 1, wherein the one or more time gap periods are aperiodic, periodic, or semi-persistent.

3. The apparatus of claim 1, wherein the one or more time gap periods are specific to the UE.

4. The apparatus of claim 1, wherein the one or more time gap periods are specific to a group of UEs including the UE.

5. The apparatus of claim 1, wherein to receive the indication of the configuration of the one or more time gap periods, the at least one processor is configured to receive the indication of the configuration of the one or more time gap periods from the base station via one of a downlink control information (DCI) message, a medium access control (MAC)—control element (CE) (MAC-CE), or a radio resource control (RRC) message.

6. The apparatus of claim 1, wherein the one or more measurements of the quality of the one or more FD beam pairs comprise a preconfigured SI measurement.

7. The apparatus of claim 6, wherein the SI measurement is performed for a first FD beam pair of the one or more FD beam pairs when the UE transmits an uplink reference signal via an uplink beam of the first FD beam pair and receives one or more messages or signals via a downlink beam of the first FD beam pair.

8. The apparatus of claim 6, wherein the one or more measurements of the quality of the one or more FD beam pairs further comprise one or more signal quality measurements, and the one or more signal quality measurements comprise a downlink signal quality measurement based on at least one downlink reference signal.

9. The apparatus of claim 8, wherein the at least one downlink reference signal comprises one of a demodulation reference signal (DMRS), a channel state information (CSI)—reference signal (RS) (CSI-RS), or a synchronization signal block (SSB).

10. The apparatus of claim 8, wherein the at least one downlink reference signal is a latest downlink reference signal before a corresponding time gap period of the one or more time gap periods, and the at least one downlink reference signal is received from the base station within a time period of a preconfigured duration immediately preceding the corresponding time gap period.

11. The apparatus of claim 8, wherein the at least one downlink reference signal is received from the base station during at least one of the one or more time gap periods.

12. The apparatus of claim 8, wherein an indication of a signal-to-interference-plus-noise-ratio (SINR) threshold associated with the SI measurement and the one or more signal quality measurements is received from the base station via one or more configured downlink reference signals during the one or more time gap periods.

13. A method of wireless communication at a user equipment (UE), comprising:
   receiving, from a base station, an indication of a configuration of one or more time gap periods associated with full duplex (FD) beam pair quality measurement;
   performing, during the one or more time gap periods, one or more measurements of a quality of one or more FD beam pairs for a calibration of the one or more FD beam pairs, the one or more FD beam pairs being currently active, each of the one or more FD beam pairs comprising an uplink beam and a downlink beam; and
   determining whether a transmission configuration indicator (TCI) state associated with each of the one or more FD beam pairs is outdated based on the one or more measurements of a level indicating a self-interference (SI) above an SI level threshold.

14. An apparatus for wireless communication at a base station, comprising:
   memory; and at least one processor coupled to the memory and configured to:
   identify a configuration of one or more time gap periods associated with full duplex (FD) beam pair quality measurement; and
   transmit, to a user equipment (UE), an indication of the configuration of the one or more time gap periods associated with FD beam pair quality measurement for a calibration of one or more FD beam pairs, the one or more FD beam pairs being currently active, the one or more time gap periods being associated with a transmission configuration indicator (TCI) state and a self-interference (SI) associated with the TCI state, wherein the TCI state is configured to be outdated based on one or more measurements of a level indicating the SI being above an SI level threshold.

15. The apparatus of claim 14, the at least one processor being further configured to: transmit, to the UE, at least one of an SI level threshold or a signal-to-interference-plus-noise-ratio (SINR) threshold associated with one or more measurements of a quality of one or more FD beam pairs, each of the one or more FD beam pairs comprising an uplink beam and a downlink beam.

16. The apparatus of claim 14, the at least one processor being further configured to:
   transmit, to the UE, at least one downlink reference signal within a time period of a preconfigured duration immediately preceding a corresponding one of the one or more time gap periods.

17. The apparatus of claim 14, further comprising a transceiver coupled to the at least one processor, the at least one processor being further configured to:
   transmit, to the UE, at least one downlink reference signal during at least one of the one or more time gap periods.

18. A method of wireless communication at a base station, comprising:
   identifying a configuration of one or more time gap periods associated with full duplex (FD) beam pair quality measurement; and transmitting, to a user equipment (UE), an indication of the configuration of the one or more time gap periods associated with FD beam pair quality measurement for a calibration of one or more FD beam pairs, the one or more FD beam pairs being currently active, the one or more time gap periods being associated with a transmission configuration indicator (TCI) state and a self-interference (SI) associated with the TCI state, wherein the TCI state is configured to be outdated based on one or more measurements of a level indicating the SI being above an SI level threshold.

* * * * *